US012756656B2

(12) United States Patent
Jain et al.

(10) Patent No.: US 12,756,656 B2
(45) Date of Patent: Oct. 6, 2026

(54) IDENTIFYING A LOOP IN AN EXTERNAL NETWORK

(71) Applicant: Hewlett Packard Enterprise Development LP, Spring, TX (US)

(72) Inventors: Rajeev Jain, Bengaluru (IN); Pravin Pitchaiappan, Bengaluru (IN); Rashmi V, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 234 days.

(21) Appl. No.: 18/485,760

(22) Filed: Oct. 12, 2023

(65) Prior Publication Data

US 2025/0126049 A1 Apr. 17, 2025

(51) Int. Cl.
*H04L 45/18* (2022.01)
*H04L 45/76* (2022.01)

(52) U.S. Cl.
CPC .............. *H04L 45/18* (2013.01); *H04L 45/76* (2022.05)

(58) Field of Classification Search
None
See application file for complete search history.

(56) References Cited

U.S. PATENT DOCUMENTS 7,656,819 B2 * 2/2010 Patel ..................... H04L 45/033 370/254
8,830,988 B2 * 9/2014 Hasan ................ H04L 41/5009 370/351
2009/0022070 A1 * 1/2009 Lovanna ............... H04L 12/465 370/256
2009/0274153 A1 * 11/2009 Kuo ........................ H04L 45/74 370/392
2012/0020357 A1 * 1/2012 Matsubara .............. H04L 69/08 370/392
2015/0333967 A1 * 11/2015 Addanki ............. H04L 12/4633 370/392
2015/0358180 A1 * 12/2015 Kamachi ................ H04L 45/18 370/249
2016/0149799 A1 * 5/2016 Yu ........................... H04L 45/66 370/392
2016/0323163 A1 * 11/2016 Abdulnour .............. H04L 67/52
2018/0288602 A1 * 10/2018 Lu ........................... H04W 8/02

* cited by examiner

*Primary Examiner* — Xavier S Wong
(74) *Attorney, Agent, or Firm* — Hewlett Packard Enterprise Patent Department

(57) ABSTRACT

A switch in a first network is provided. During operation, the switch can learn a media access control (MAC) address of a packet from a second network via a first port. The MAC address can be learned in association with an aggregate virtual local area network (VLAN) configured on the first network for traffic from the second network. The switch can inspect the packet to determine an external VLAN configured on the second network. The switch can send, via the first port a packet on the external VLAN. The source and detector addresses can be a local address. The destination address can be a multi-destination address. The switch can identify the local address as the detector address in a packet received from a second port coupling the second network, identify a loop in the second network in association with the external VLAN, and disable transmission via the second port.

20 Claims, 10 Drawing Sheets

IDENTIFYING A LOOP IN AN EXTERNAL NETWORK

BACKGROUND

A switch in a network may support different protocols and services. For example, the switch can be in a provider network that can transport traffic from multiple client networks spanning multiple sites. Consequently, if there is a loop in a client network, the provider network can receive duplicate packets and be adversely affected.

BRIEF DESCRIPTION OF THE FIGURES

In the figures, like reference numerals refer to the same figure elements.

DETAILED DESCRIPTION

Figure 1A:
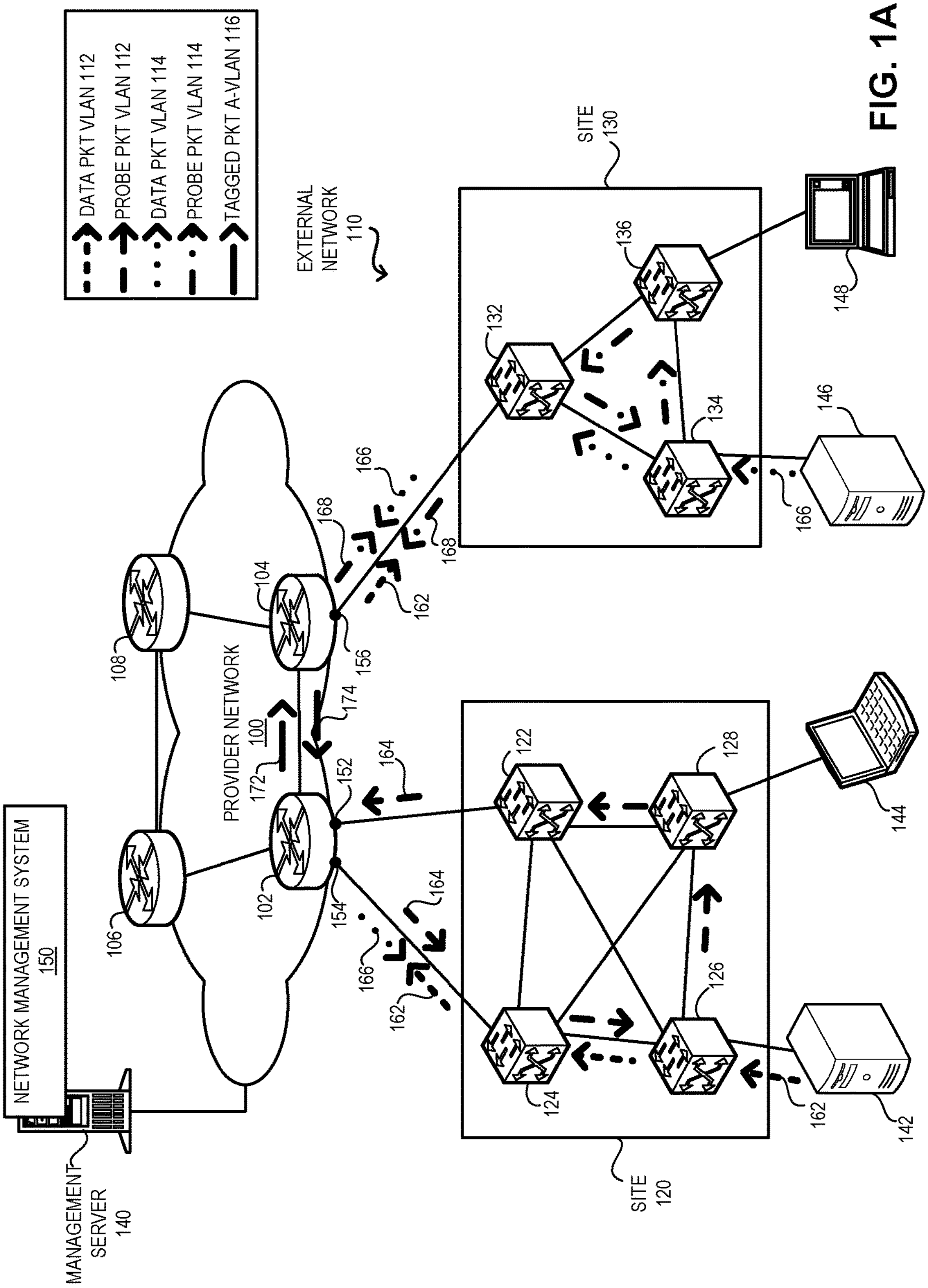
FIG. 1A illustrates examples of detecting a loop in an external network, in accordance with an aspect of the present application.

A provider network can facilitate connectivity among different sites of customer networks. An edge switch in the provider network can be coupled to a customer network. Here, the customer network can be an external network with respect to the provider network. In particular, because the administrative domain and protocols deployed in the provider network and the customer network can be different, these networks can be considered external to each other. A customer network, such as an enterprise network, can be deployed across multiple sites of the enterprise. The customer network may deploy one or more virtual local area networks (VLANs), each of which can be a virtualized network of the customer network allocated to a department or segment of the enterprise. End devices associated with the same department of the enterprise may belong to the VLAN configured for the department. If the department is distributed among the multiple sites of the enterprise, the VLAN can also span the multiple sites.

Consequently, the traffic from the customer network can be a part of a VLAN spanning multiple sites. Because such a VLAN is defined as a virtualized network in the customer network, the VLAN can also be referred to as a customer VLAN or C-VLAN. When the traffic of the C-VLAN is sent from one site to another, the traffic can be carried in the provider network. The forwarding of traffic belonging to a C-VLAN via the provider network can be referred to as provider bridging. The provider bridging needs to preserve the C-VLAN identifier so that the C-VLAN can be identified at the receiving site. However, the provider network can also facilitate provider bridging of other VLANs of the customer network as well as traffic from other customer networks. To separate traffic belonging to different customer networks, the provider network also needs to deploy another set of VLANs, one for each customer network. Because the VLAN in the provider network aggregates traffic of all C-VLANs of a customer network, a VLAN at the provider network can be referred to as an aggregate VLAN.

To preserve the C-VLAN identifier and ensure traffic of each customer network is separated (or segregated), the provider network can associate the traffic with the aggregate VLAN corresponding to the customer network. Accordingly, upon receiving a packet belonging to a C-VLAN from the customer network, an ingress switch of the provider network can add another VLAN tag or identifier of the aggregate VLAN associated with the customer network. The egress switch of the provider network can remove this VLAN identifier before forwarding the packet back to the same customer network (e.g., to another site). In some examples, the aggregate VLAN can be defined based on a service VLAN (S-VLAN). An S-VLAN is an aggregate VLAN provided by the Q-in-Q feature of Provider Bridging, as defined in the Institute of Electrical and Electronics Engineers (IEEE) 802.1AD specification. To facilitate the S-VLAN in the provider network, the edge ports can be configured with Provider Bridging. With such a configuration, a loop in an external network, such as a customer network, may adversely affect the provider network. Detecting the loop in the external network can be challenging.

Aspects described herein address the problem of detecting a loop in an external network by (i) discovering the VLANs defined in the external network; (ii) sending a layer-2 probe packet to the external network on each VLAN; and (iii) determining the presence of a loop in the external network upon receiving the probe packet back. Here, a VLAN in the external network can be referred to as an external VLAN. When a switch in a provider network generates a probe packet, the switch can set a multi-destination address (e.g., a multicast or broadcast address) as the destination address of the probe packet. As a result, the probe packet can be flooded in the external network. The switch (or another switch in the provider network) can receive the packet if a loop exists in the external network, thereby detecting the loop in the external network.

A customer network can span multiple geographically distributed sites. These sites can communicate with each other over a provider network. To facilitate inter-site communication, a respective site of the customer network can be coupled to at least one edge switch of the provider network via one or more edge ports, which can be referred to as customer network ports. From the provider network's perspective, the customer networks can be separately managed external networks. End devices (e.g., user devices) coupled to one site of the customer network may send packets to end devices coupled to another site. These packets can be tagged with corresponding identifiers of external VLANs (e.g., C-VLAN tags). When an edge switch of the provider network receives such a packet, the edge switch can add or tag an aggregate VLAN identifier to the packet and forward the double-tagged packet via the provider network.

With existing technologies, to ensure the aggregation of traffic for a customer network while facilitating the separation of traffic among multiple customer networks, a respective customer network can be associated with an aggregate VLAN (e.g., a service VLAN or S-VLAN). Consequently, when the switch receives a packet from a particular customer network at an edge switch, the switch can identify the aggregate VLAN allocated to the customer network and tag the packet with the aggregate VLAN identifier. Therefore, at each of the edge ports, all external VLANs of a particular network (e.g., all C-VLANs of a customer network) can be aggregated into the corresponding aggregate VLAN. Consequently, the switch learns the media access control (MAC) addresses from the customer network corresponding to the aggregate VLAN, and does not need to identify the external VLANs with these MAC addresses.

The external network may include a loop if the external network is unmanaged or contains a configuration error. The loop may cause the switch in the provider network to repeatedly receive duplicate packets, which are then forwarded to remote sites of the external network on the aggregate VLAN. When the switch is coupled to multiple external networks, the switch may not run a spanning tree protocol in the client network to maintain the separation of clients. Furthermore, since the switch may not learn MAC addresses on the external VLANs, it can be challenging for the switch to perform loop detection in the external network, which requires per-VLAN probing for loops in the external network.

To address this problem, the switch in the provider network can discover the external VLANs of an external network and probe individual external VLANs for a loop. For example, an external network can be a customer network. And an external VLAN can be a C-VLAN. During operation, the switch can receive a packet from the external network on an external VLAN via an ingress port of the switch. If the packet is an initial packet of a data flow or a corresponding control packet (e.g., an Address Resolution Protocol packet), the switch can learn a new MAC address at the ingress port in association with the aggregate VLAN allocated to the external network. The learned MAC address can be the source MAC address of the packet. In addition, the switch may sample packets (e.g., one in every N packets) at edge ports or mirror packets to the central processor in regular intervals. MAC address learning, packet sampling, and mirroring can be referred to as discovery operations. A discovery operation can select packets for further inspection so that an external VLAN can be determined.

Upon performing a discovery operation, the switch can perform further inspection (e.g., packet snooping) to determine the external VLAN of the corresponding packet. Here, the packet can be the sampled packet, mirrored packet, or the packet from which a new MAC address is learned. In this way, the switch can discover the external VLAN defined in the external network. The discovery process can also include a user (e.g., an administrator) providing the list of external VLANs associated with each edge port to the switch via configuration. Upon discovering the external VLAN, the switch can store an external VLAN identifier and a port identifier of the edge port from which the external VLAN is identified in a discovery database. Here, the discovery database can be a relational database or a data structure (e.g., a table).

The switch can then generate a loop-detection probe packet. The loop detection packet can include a source MAC address, a destination MAC address, and a detector MAC address. The destination MAC address can be a multi-destination address (e.g., a multicast or broadcast address). The source and detector MAC addresses can be the MAC address of the switch. The switch can send the probe packet from the port, which can be the egress port for the probe packet, in response to a trigger event. For example, when the switch learns a new MAC address, the switch can send the probe packet over the external VLAN associated with the probe packet. The switch may also send periodic probe packets for the external VLANs in the discovery database via corresponding ports.

The switch can monitor the fields (e.g., header fields) of ingress packets at the edge port. The switch can determine an ingress packet as the probe packet based on one or more fields of the ingress packet. If the switch determines that it has received the probe packet back from an edge port, which can be the same as the egress port or a different port), coupling the external network, the switch can detect the presence of a loop in the external network. In some examples, the switch receiving a predetermined number of probe packets back can cause the switch to detect the loop. The switch can detect the probe packet by determining that the detector MAC address in the received packet is allocated to the switch. Depending on the configuration of the switch, the switch may then disable the ingress or receiving port, or disable the external VLAN on which the packet has been sent. Here, the ingress port can be the loop port. On the other hand, if the switch receives the probe packet via port coupling another switch in the provider network, the switch can disable the egress port, which can be the loop port, since a port in the provider network may be used by multiple client networks. In this way, the switch can break the loop in the external network while operating in the provider network.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates examples of detecting a loop in an external network, in accordance with an aspect of the present application. A provider network 100 can include a number of switches 102, 104, 106, and 108, and may include heterogeneous network components, such as layer-2 and layer-3 hops and tunnels. In some examples, network 100 can be an Ethernet, InfiniBand, or other network, and may use a corresponding communication protocol, such as Internet Protocol (IP), FibreChannel over Ethernet (FcoE), or other protocol. Network 100 can be distributed across a wide-area network (WAN), such as the Internet. For example, switches 102 and 104 can be geographically dispersed and can be coupled to each other over a set of switches and links of the WAN.

One or more switch pairs of network 100 can be coupled to each other via a tunnel. In some examples, switches of a respective fabric in network 100 may form a mesh of tunnels (not shown in FIG. 1). Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer.

Network 100 can facilitate connectivity to one or more external networks. One such network can be an external network 110 distributed across sites 120 and 130 over network 100. External network 110 can be a customer network. Since the administrative domain of networks 100 and 110 can be different, networks 100 and 110 can be considered external to each other. Site 120 can include switches 122, 124, 126, and 128; and site 130 can include switches 132, 134, and 136. A respective switch in a respective site can be associated with a MAC address and an IP address. End devices 142, 144, 146, and 148 can be coupled to switches 126, 128, 134, and 136, respectively. Edge ports 152 and 154 of switch 102 can couple switches 122 and 124, respectively, thereby coupling site 120 to network 100. Similarly, edge port 156 of switch 104 can couple switch 136, thereby coupling site 130 to network 100.

A network management system (NMS) 150, which can be a network orchestrator, can configure a respective switch in network 100. NMS 150 can be a cloud-based system operating on a management server 140. NMS 150 can operate on a network controller or an SDN controller. NMS 150 can control the management plane of networks 100. To do so, an administrator can use NMS 150 (e.g., using a dashboard or console) to configure the operating parameters based on which the switches in network 100 may operate. Examples of the operating parameters can include, but are not limited to, VLAN (the mapping between external VLANs to a corresponding aggregate VLAN), tunneling, routing, and forwarding parameters.

External VLANs 112 and 114, which can be C-VLANs, can be configured on network 110. End devices 142 and 148 can belong to external VLAN 112, and end devices 144 and 146 can belong to external VLAN 114. To preserve the respective identifiers of VLANs 112 and 114 and to ensure traffic of each customer network is separated, network 110 can deploy an aggregate VLAN 116 for network 110. Therefore, switches 102 and 104 can map respective identifiers of VLANs 112 and 114 to the identifier of VLAN 116. Aggregate VLAN 116 can be an S-VLAN provided by the Q-in-Q feature of Provider Bridging, as defined in the IEEE 802.1AD specification. To facilitate the S-VLAN in network 100, ports 152, 154, and 156 can be configured with Provider Bridging. If end device 142 sends a packet 162 to end device 148 over VLAN 112, switch 126 can receive packet 162 and forward it to network 100 via switch 124. Upon receiving packet 162 at port 154, switch 102 can add another VLAN tag or identifier of aggregate VLAN 116 to packet 162 to generate a double-tagged packet 172.

Since end device 148 is associated with site 130, switch 104 can be the egress switch for packet 162 in network 100. Accordingly, switch 102 can forward packet 172 to switch 104 over network 100. Switch 104 can remove the VLAN identifier of aggregate VLAN 116 before forwarding packet 162 back to network 110 at site 130. Similarly, if end device 146 sends a packet 166 to end device 144 over VLAN 114, switch 104 can receive packet 166 at port 156 and add another VLAN tag or identifier of aggregate VLAN 116 to packet 166 to generate a double-tagged packet 174. Switch 104 can forward packet 174 to switch 102 over network 100. Switch 102 can remove the VLAN identifier of aggregate VLAN 116 before forwarding packet 166 back to network 110 at site 120.

With existing technologies, at port 152, 154, and 156, VLANs 112 and 144 of network 110 can be aggregated into corresponding aggregate VLAN 116. Consequently, switch 102 can learn the MAC address of end device 142 in association with aggregate VLAN 116, without associating the MAC address of end device 142 with VLAN 112. In other words, switch 102 may not learn VLAN 112 with the MAC address. Similarly, switch 104 can learn the MAC address of end device 146 in association with aggregate VLAN 116 without associating the MAC address with VLAN 114. If site 120 includes a loop, it may cause switch 102 to repeatedly receive duplicate packets, which are then forwarded to site 130 on aggregate VLAN 116. However, because switch 102 may be coupled to multiple customer networks, switch 102 may not run a spanning tree protocol in network 110 because running the protocol may breach the separation of clients. For example, if multiple customer networks use the same VLAN (i.e., the same VLAN identifier), the protocol may exchange information of one customer network with another while forming a spanning tree on the VLAN. Furthermore, since switch 102 may not learn MAC addresses on VLANs 112 and 114, it can be challenging for switch 102 to run a loop detection mechanism in network 110, which requires per-VLAN probing for loops in network 110.

To address this problem, switches 102 and 104 can discover VLANs 112 and 114 of network 110 and probe individual VLANs for a loop. When switch 102 receives packet 162 on VLAN 112 via port 154, switch 102 can learn the MAC address of end device 142 at port 154 in association with aggregate VLAN 116. Switch 102 can then perform further inspection on packet 162 to determine VLAN 112 associated with packet 162. In addition to MAC address learning, switch 102 may also select packet 162 for further inspection by packet sampling or packet mirroring on packets belonging to aggregate VLAN 116. Here, MAC address learning, packet sampling, and packet mirroring can be referred to as discovery operations that can discover a VLAN. The discovery operation can also include a user providing respective lists of VLANs associated with ports 152 and 154 to switch 102 via by configuring the lists of VLANs at NMS 150. Upon discovering VLAN 112, switch 102 can store the identifier of VLAN 112 and a port identifier of port 154 (i.e., from which VLAN 112 is learned) in a discovery database.

Switch 102 can generate a loop-detection probe packet 164. Packet 164 can include a source MAC address, a destination MAC address, and a detector MAC address. The destination MAC address can be a multi-destination address (e.g., a multicast or broadcast address). The source and detector MAC addresses can be the MAC address of switch 102. Switch 102 can send (or egress) packet 164 from port 154 over VLAN 112 in response to a trigger event. Examples of the trigger event can include, but are not limited to, switch 102 learning the MAC address of end device 142 and a periodic trigger. The periodic trigger can cause switch 102 to periodically probe a respective VLAN in the discovery database of switch 102.

Switch 102 can monitor the fields (e.g., header fields) of ingress packets at ports 152 and 154. Switch 102 can determine an ingress packet as a probe packet based on one or more fields of the ingress packet. If switch 102 determines that it has received packet 164 back on port 152, which can also couple network 110, switch 102 can detect the presence of a loop at site 120 of network 110. In some examples, switch 102 receiving a predetermined number of instances of packet 164 can cause switch 102 to detect the loop. Switch 102 can identify packet 164 as a probe packet by determining that the detector MAC address in the received packet is allocated to switch 102.

Similarly, by performing a discovery operation, switch 104 can determine VLAN 114 from port 156. Accordingly, switch 104 can send a probe packet 168 via port 156 over VLAN 114. Packet 168 can include the MAC of switch 104 as the detector MAC address. If switch 104 receives packet 168 back on port 156, switch 104 can detect the presence of a loop at site 130 of network 110. Hence, a switch in network 100 can detect the presence of a loop in network 110 by receiving a probe packet back on the same port, which is the case for packet 168, or on a different port, which is the case for packet 164.

Upon detecting the loop at site 120 via port 152, switch 102 can determine port 152 as the loop port causing the loop and perform a mitigating action. For example, depending on the configuration, switch 102 may disable port 152, or disable VLAN 112 on port 152. Switch 104 can also perform a mitigating action, which can include disabling port 156 or disabling VLAN 114 on port 156, to break the loop in site 130. Switch 102 may also notify NMS 150 regarding the loops. NMS 150 can present an error message to the administrator indicating the presence of the loops in sites 120 and 130 of network 110. Switches 102 and 104 may perform the respective mitigating actions upon detecting the corresponding loops or upon receiving validation or confirmation from NMS 150 (e.g., upon verification from the administrator).

Figure 1B:
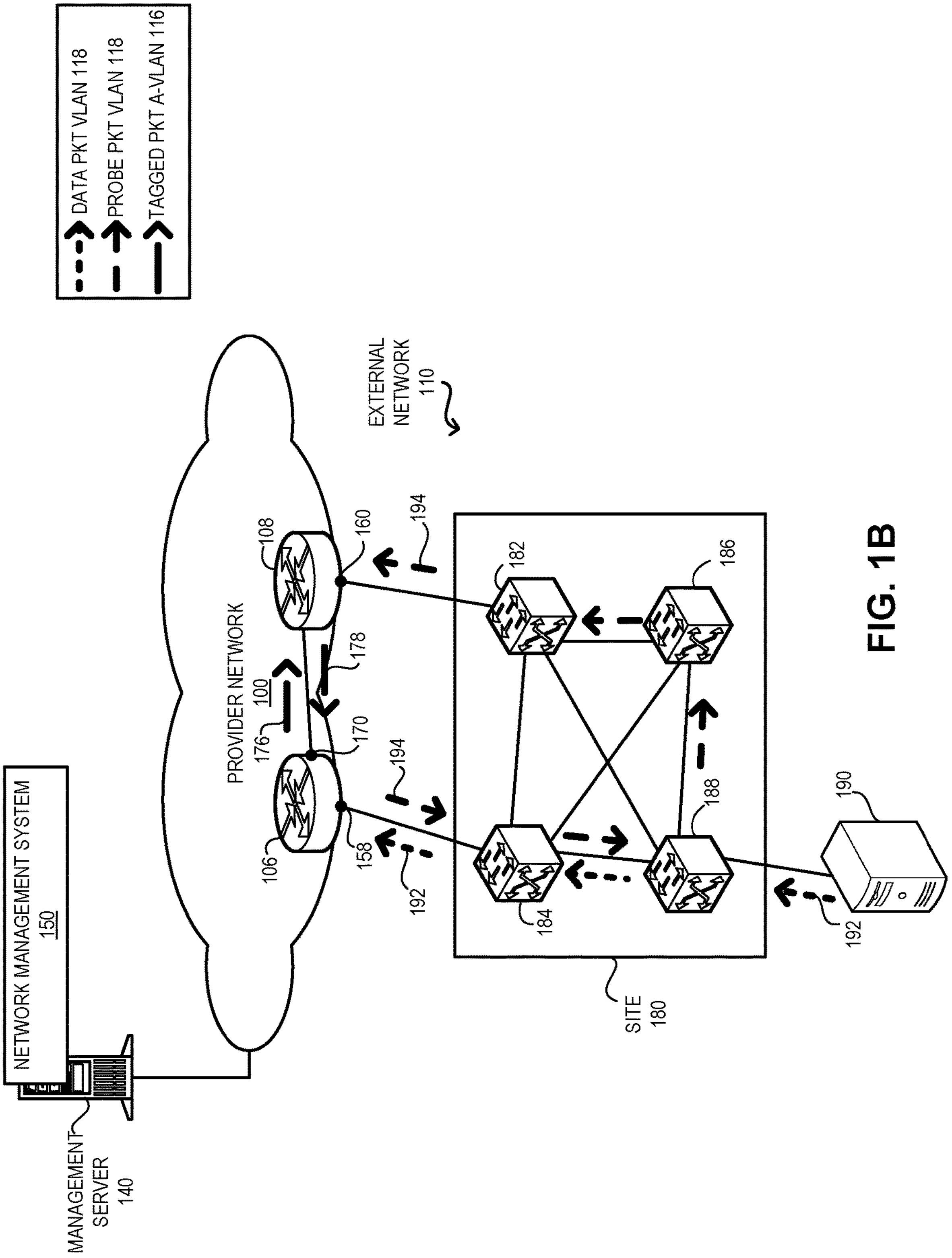
FIG. 1B illustrates another example of detecting a loop in an external network, in accordance with an aspect of the present application.

FIG. 1B illustrates another example of detecting a loop in an external network, in accordance with an aspect of the present application. In this example, network 110 can also include site 180, which can be coupled to switches 106 and 108 of network 100. Site 180 can include switches 182, 184, 186, and 188. A respective switch in site 180 can be associated with a MAC address and an IP address. An end device 190 belonging to an external VLAN 118 can be coupled to switch 188. Switch 184 can be coupled to port 158 of switch 106, and switch 182 can be coupled to port 160 of switch 108. Since aggregate VLAN 116 is allocated to network 110, VLAN 118 can be mapped to aggregate VLAN 116.

If end device 190 sends a packet 192 over VLAN 118, switch 106 can receive packet 192 at port 158. Switch 106 can add another VLAN tag or identifier of aggregate VLAN 116 to generate a double-tagged packet 176. Switch 102 can also learn the MAC address of end device 190 at port 158 in association with aggregate VLAN 116. Switch 102 can then perform further inspection on packet 192 to determine VLAN 118 associated with packet 192. Upon discovering VLAN 118, switch 106 can store the identifier of VLAN 118 and a port identifier of port 158 in a discovery database. In response to a trigger event, switch 106 can generate a loop-detection probe packet 194. The source and detector MAC addresses of packet 194 can be the MAC address of switch 106. The destination MAC address of packet 194 can be a multi-destination address. Switch 102 can then send packet 194 from port 158 over VLAN 118.

If packet 194 loops within site 180 and reaches switch 182 via port 160, switch 182 can forward packet 194 to switch 108. When switch 108 receives packet, switch 108 can determine that the destination address of packet 194 is a multi-destination address. Therefore, switch 108 can forward packet 194 to a respective switch that includes an edge port configured with VLAN 118, such as switch 106. Switch 108 may add a VLAN identifier of aggregate VLAN 116 to packet 194 to generate a double-tagged packet 178. Switch 108 can then send packet 178 to switch 106. Switch 106 can receive packet 178 via port 170, which can be a local network port (i.e., a port coupling another switch in within the same provider network 100).

Switch 106 can determine that packet 178 corresponds to a probe packet by identifying the detector MAC address as a local address. Even though switch 106 can receive packet 178 via port 170, switch 106 may not apply any mitigating action to port 170 since port 170 may be used by multiple client networks. Instead, switch 106 can apply a mitigating action to port 158, which can be the egress port of packet 194. Therefore, even if switch 106 receives a probe packet over network 100, switch 106 can break the corresponding loop in network 110 while operating in network 100.

Figure 2:
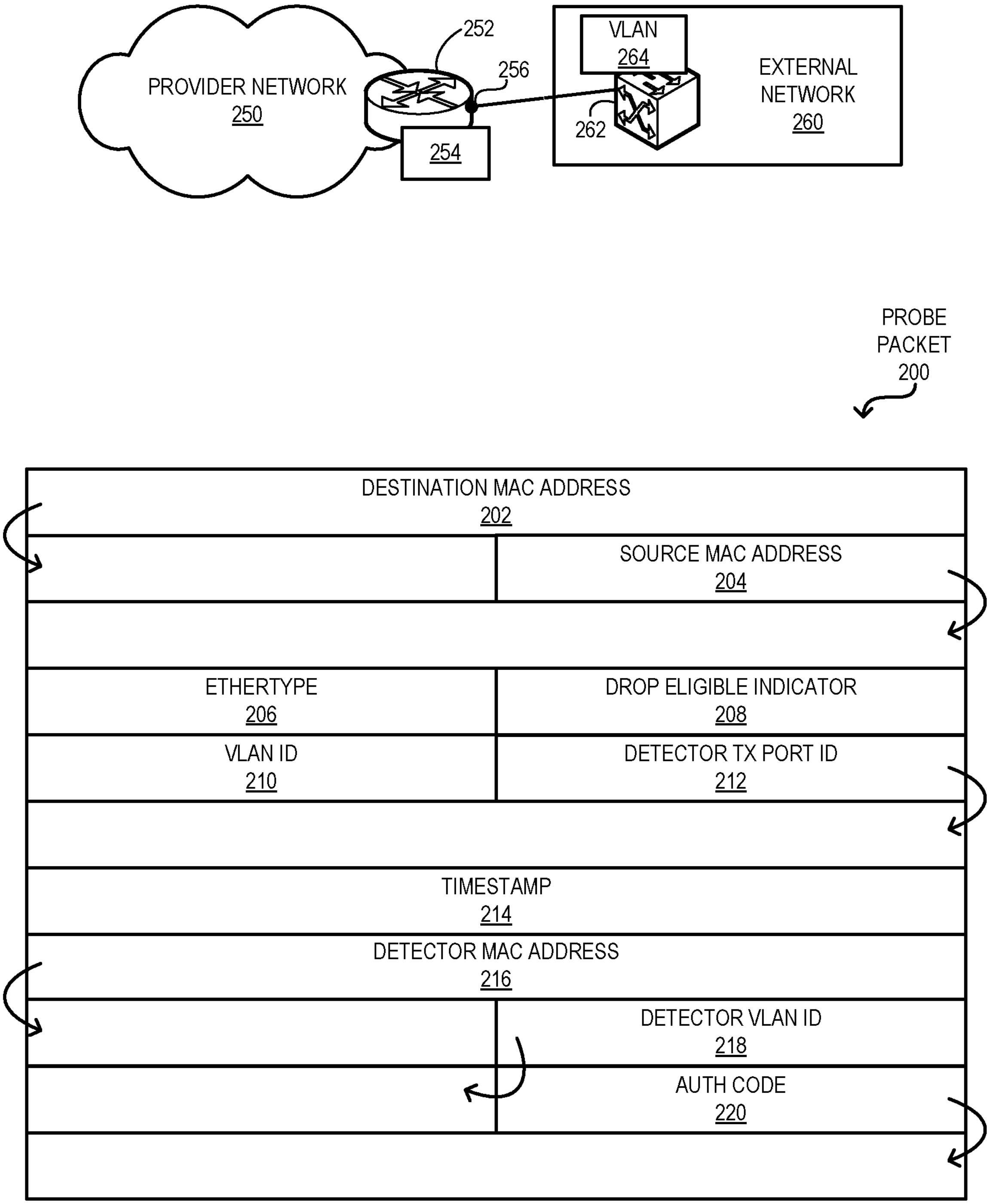
FIG. 2 illustrates an example of a probe packet used for detecting a loop in an external network, in accordance with an aspect of the present application.

FIG. 2 illustrates an example of a probe packet used for detecting a loop in an external network, in accordance with an aspect of the present application. A loop-detecting probe packet 200 can include a number of fields, such as a destination MAC address 202, a source MAC address 204, an Ethertype 206, a drop eligible indicator (DEI) 208, and a VLAN identifier 210. Typically, these fields are included in a layer-2 header (e.g., an Ethernet header) of packet 200. In addition, packet 200 can include a number of probing fields, such as a detector transmission port identifier 212, a timestamp 214, a detector MAC address 216, a detector VLAN identifier 218, and an authorization code 220. The probing fields can be included in the payload of packet 200. It should be noted that some of the probing fields can be included in the header of packet 200 as well.

Suppose that switch 252 of provider network 250 sends packet 200 via port 256 to switch 262 of an external network 260 on an external VLAN 264. Destination MAC address 202 can then be a multi-destination address (e.g., a multicast or broadcast MAC address). MAC address 254 of switch 252 can be both source MAC address 204 and detector MAC address 216. Ethertype 206 can include an organizationally unique identifier (OUI) Extended Ethertype, as defined in IEEE 802.a specification. The identifier or tag of VLAN 264 can be both VLAN identifier 210 and detector VLAN identifier 218. Here, source MAC address 204 and VLAN identifier 210 are used for forwarding packet 200 in networks 250 and 260. On the other hand, switch 252 can use detector MAC address 216 and detector VLAN identifier 218 to detect the presence of a loop in network 260 on a particular VLAN.

DEI 208 can indicate whether packet 200 can be dropped if congestion is detected. Port identifier 212 can include the port identifier of port 256. In this way, if switch 252 receives packet 200 back, switch 252 can determine which is the original egress port for packet 200. Timestamp 214 can indicate when packet 200 is generated. Timestamp 214 allows switch 252 to detect stale packets. For example, if the current time at switch 252 is beyond a threshold period from timestamp 214, switch 252 may discard packet 200. Furthermore, authorization code 220 can include a verification code for packet 200.

Figure 3:
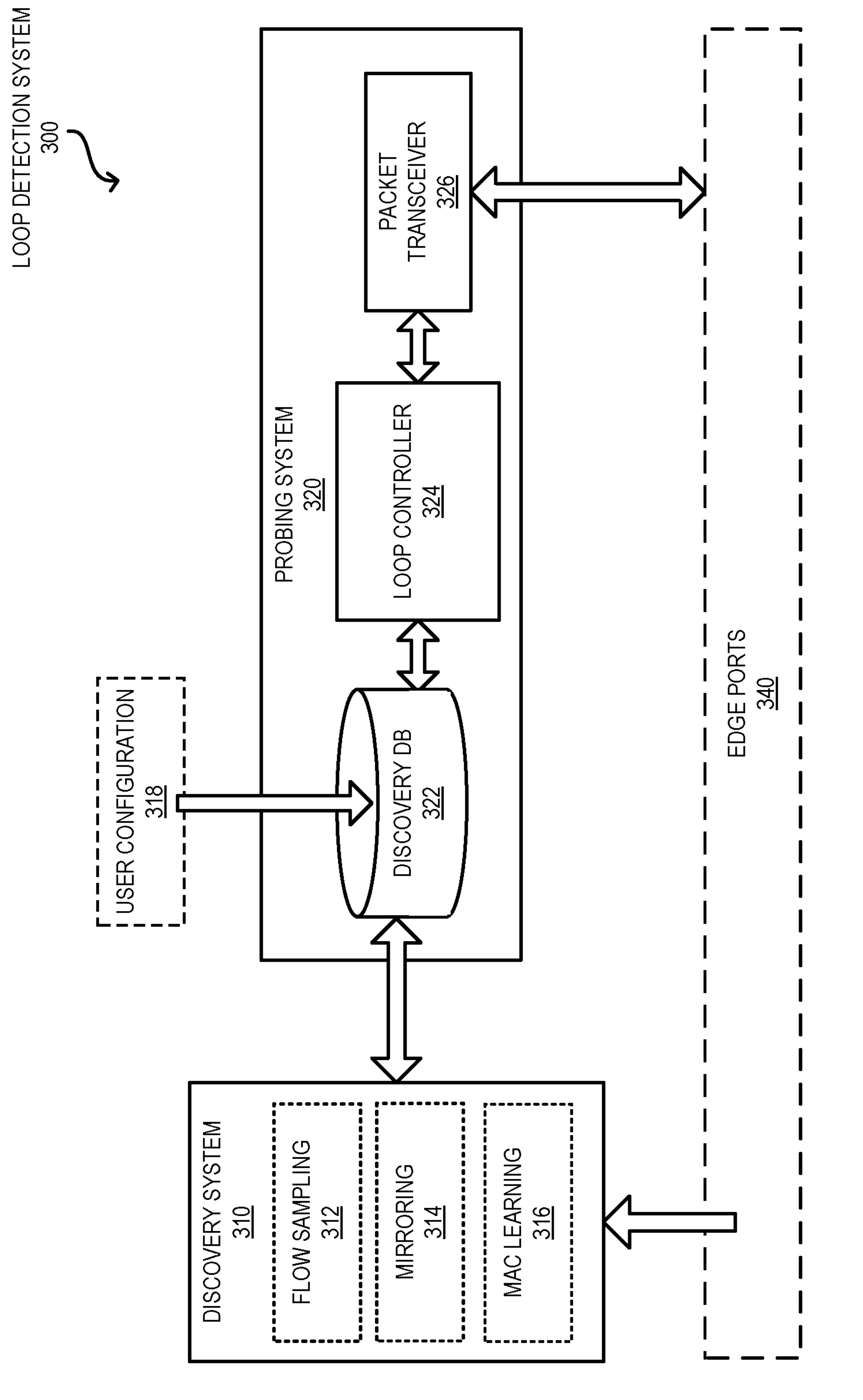
FIG. 3 illustrates an example of a loop detection system probing an external network for detecting a loop, in accordance with an aspect of the present application.

FIG. 3 illustrates an example of a loop detection system probing an external network for detecting a loop, in accordance with an aspect of the present application. A loop detection system 300 can be deployed on the edge switches of a provider network. System 300 can include a discovery system 310 and a probing system 320. Discovery system 310 can determine an external VLAN in an external network. Discovery system 310 can facilitate a number of discovery operations, such as flow sampling 312, mirroring 314, and MAC learning 316. Flow sampling operation 312 can sample packets from a respective packet flow on an aggregate VLAN (e.g., using sFlow sampling). Mirroring operation 314 can mirror packets on an aggregate VLAN to a processor of the switch. MAC learning operation 316 can learn a new MAC address (i.e., currently not present in the MAC table of the switch) from ports 340 of the switch.

Performing a discovery operation selects one or more packets for further inspection (e.g., using packet snooping). Discovery system 310 can then inspect additional fields, such as the C-VLAN field of Q-in-Q encapsulation, of the selected packets to identify an external VLAN in an external network reachable via ports 340. A user can also provide a list of external VLANs in the external network using configuration 318. A discover database 322 of system 320 can then store an identifier of the external VLAN in association with respective ports from which the corresponding packets are received. Database 322 can be a relational database managed by a Database Management System (DBMS). Database 322 may also be a data structure maintained in the memory of the switch.

A loop controller 324 of system 320 can determine a trigger event and initiate packet probing. For example, loop controller 324 can probe a respective external VLAN in database 322 to determine whether a loop is present. To do so, loop controller 324 can select an external VLAN from database 322 based on a selection process. Examples of the selection process can include, but are not limited to, random selection, round-robin selection, and event-based selection. If the trigger event is learning a MAC address, the event-based selection can select the external VLAN identified through the MAC address learning.

A packet transceiver 326 can generate a probe packet and send it via a corresponding port in ports 340. Packet transceiver 326 can also determine whether a packet received from one of ports 340 is a probe packet based on one or more fields, such as one or more address fields and Ethertype, of a received packet. Furthermore, packet transceiver 326 can determine whether the packet is sent from the switch (e.g., based on the detector MAC address in the packet). If the packet is sent from the switch, loop controller 324 can detect a loop in the external network.

Figure 4A:
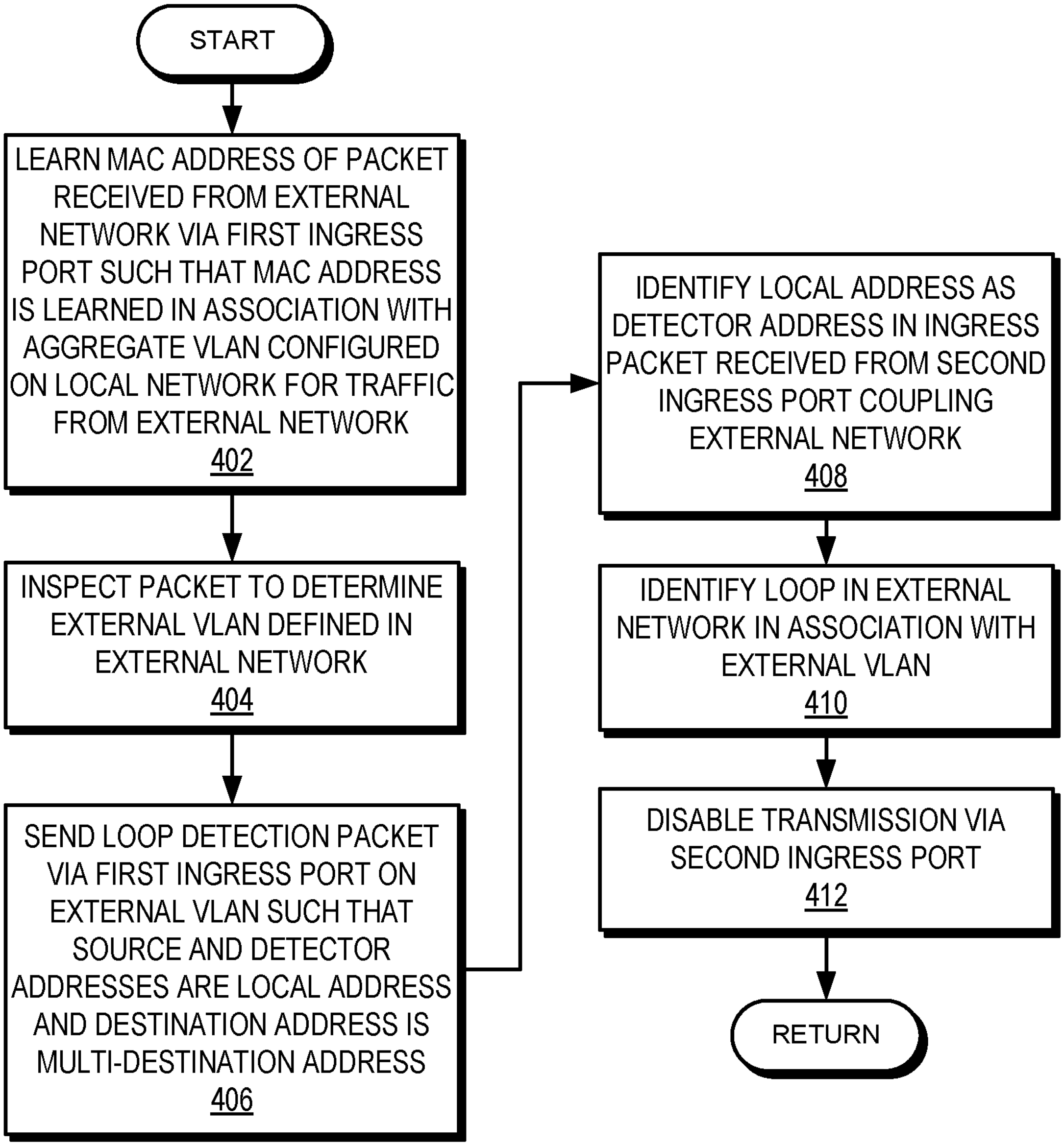
FIG. 4A presents a flowchart illustrating the process of a switch in a network identifying a loop in an external network, in accordance with an aspect of the present application.

FIG. 4A presents a flowchart illustrating the process of a switch in a network identifying a loop in an external network, in accordance with an aspect of the present application. During operation, the switch can learn a MAC address of a packet (e.g., the source MAC address of the packet) received from an external network via a first ingress port such that the MAC address is learned in association with an aggregate VLAN configured on the local network for traffic from the external network (operation 402). The local network can be the network to which the switch belongs. The switch can use a layer-2 MAC address learning process (e.g., Ethernet MAC address learning) to learn the MAC address. However, since any packet received from another switch of the network is going to be received via the aggregate VLAN, the switch can learn the MAC address on the aggregate VLAN. This allows the switch to forward packets that are destined to the MAC address and received on the aggregate VLAN via the first ingress port.

The switch can then inspect the packet to determine an external VLAN defined in the external network (operation 404). The switch may perform an additional inspection on the header of the packet to determine the VLAN identifier of the external VLAN. For example, if the header of a packet is based on Q-in-Q encapsulation, the switch can learn the MAC address of the packet on the S-VLAN and perform additional inspection to determine the C-VLAN from the Q-in-Q encapsulation. Discovering the external VLAN, which is typically not performed by the switch during the MAC address learning process, allows the switch to probe the external VLAN from the first ingress port. The switch can then send a loop detection packet via the first ingress port on the external VLAN such that the source and detector addresses are a local address, and the destination address is a multi-destination address (operation 406). The use of the multi-destination address ensures that the packet is distributed among all switches of the external network. If there is a loop, the packet is going to be sent back to the originating network. Furthermore, the detector address allows the switch to identify a packet that has been looped back to the switch.

Accordingly, the switch may identify the local address as the detector address in an ingress packet received from a second ingress port coupling the external network (operation 408). Here, the second ingress port can be the same as the first ingress port or a different port of the switch. If the local address (i.e., an address allocated to the switch) is the detector address of a received packet, the packet has originated from the switch and hence, has been looped back via the second ingress port. Therefore, upon receiving such a packet, the switch can identify a loop in the external network in association with the external VLAN (operation 410) and disable transmission via the second ingress port (operation 412). The disablement can be a mitigating action for breaking the loop in the external VLAN.

Figure 4B:
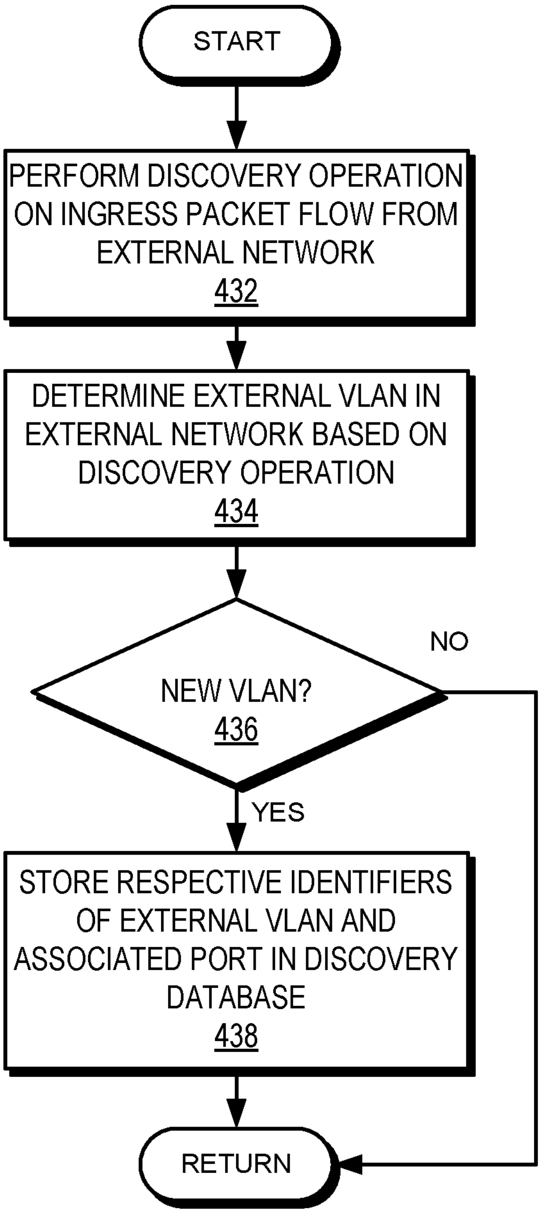
FIG. 4B presents a flowchart illustrating the process of a loop detection system discovering virtual local area networks (VLANs) in an external network, in accordance with an aspect of the present application.

FIG. 4B presents a flowchart illustrating the process of a loop detection system discovering VLANs in an external network, in accordance with an aspect of the present application. During operation, the system can perform a discovery operation on an ingress packet flow from an external network (operation 432). The discovery operation can select packets for further inspection so that an external VLAN can be determined. Examples of the discovery operation can include, but are not limited to, MAC address learning, packet sampling, and packet mirroring. The system can then determine an external VLAN in the external network based on the discovery operation (operation 434). In particular, the system may inspect the packet to identify the fields comprising external VLAN information (e.g., a C-VLAN identifier) to determine the external VLAN. The system can then determine whether the VLAN is a new VLAN (i.e., not currently in the discovery database) (operation 436). If the VLAN is a new VLAN, the system can store the respective identifiers of the VLAN and an associated port in the discovery database (operation 438). The discovery database can then allow the system to identify the external VLANs and probe each external VLAN for loops. Since the system can be aware of multiple external VLANs, the system may probe the external VLANs of the discovery database in parallel.

Figure 4C:
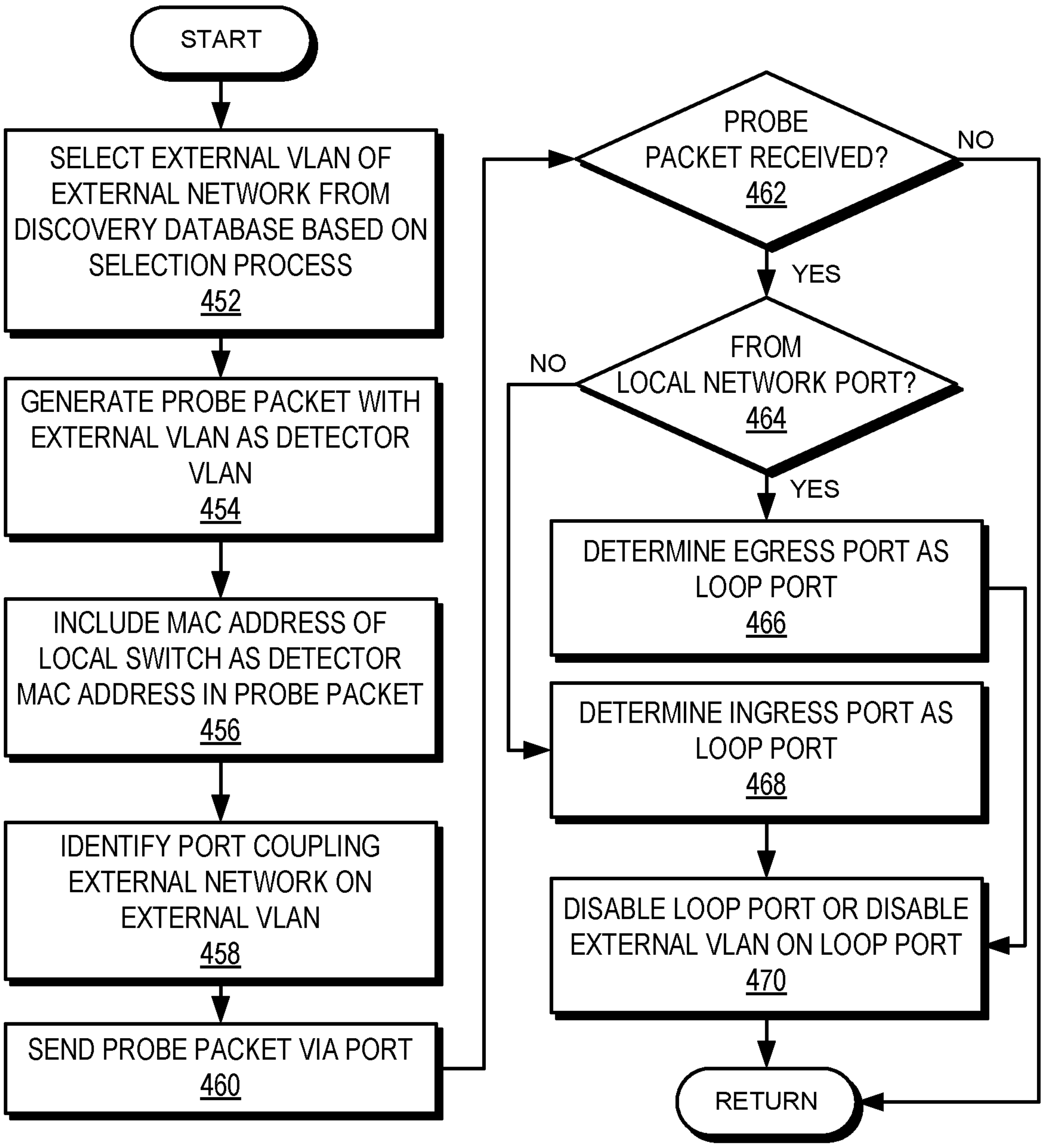
FIG. 4C presents a flowchart illustrating the process of a loop detection system probing for a loop in an external network on a VLAN, in accordance with an aspect of the present application.

FIG. 4C presents a flowchart illustrating the process of a loop detection system probing for a loop in an external network on a VLAN, in accordance with an aspect of the present application. During operation, the system can select a VLAN of an external network from the discovery database based on a selection process (operation 452). The system can select the VLAN in response to a trigger event. The trigger event can be an event that can initiate the probing for loops. The trigger event can be the expiration of an interval for periodic probing or a specific event at a switch (e.g., learning a new MAC address). The trigger event can lead to a selection process that can select an external VLAN for probing. Examples of the selection process can include, but are not limited to, random selection, round-robin selection, parallel selection, and event-based selection (e.g., a new MAC address learning event can select an external VLAN associated with the MAC address).

The system can then generate a probe packet with the VLAN as the detector VLAN (operation 454) and include the MAC address of the local switch (i.e., the switch running the system). The system can also include the detector MAC address in the probe packet (operation 456). The detector address allows the system to identify a packet that has been looped back to the local switch. Similarly, the detector VLAN allows the system to identify on which VLAN a loop has been detected if the packet is looped back. The system can identify a port coupling the external network on the VLAN (operation 458). This port can be the port from which the system has identified the VLAN. The system may obtain the information associated with this port (e.g., the port identifier) from the discovery database when the external VLAN is selected for probing. For example, the external VLAN is discovered while a MAC address is learned from the port, the external VLAN can be reachable via the port. Subsequently, the system can send the probe packet via the port (operation 460). Hence, the port can be the egress port of the probe packet.

The system can then determine whether the probe packet is received (operation 462). Receiving the probe packet indicates that the packet has been looped back. If the probe packet is received, the system can determine whether the packet is received from a local network port (operation 464). The local network port can be a port that couples the local switch with another switch within the same network. Therefore, receiving a packet via the network port indicates that the packet has been looped back to the other switch. If the packet is received from a local network port, the system can determine the egress port as the loop port (operation 466). Because the local network port can be used for inter-switch traffic of multiple clients, the system cannot disable the local network port to break the loop. Therefore, the system can select the egress port as a loop port. On the other hand, if the packet is not received from a local network port, the packet is received from an edge (or client) port. The system can then determine the ingress port as the loop port (operation 468). Because the ingress port is a client-facing port on the loop, the system can select the ingress port of the looped-back packet as the loop port. Upon determining the loop port (operation 466 or 468), the system can disable the loop port or disable the VLAN on the loop port (operation 470). The disablement can then break the loop by preventing a packet from being looped-based via the loop port.

Figure 5:
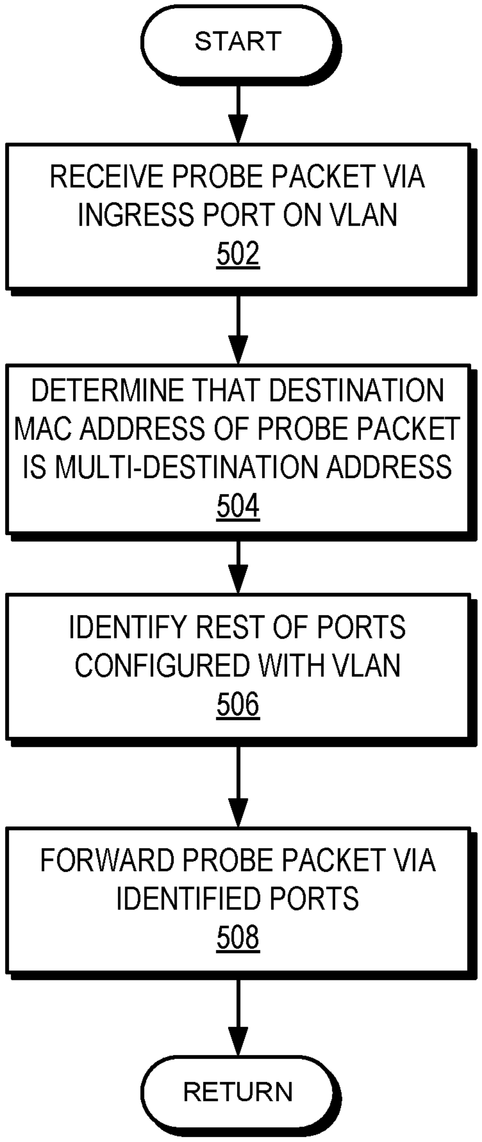
FIG. 5 presents a flowchart illustrating the process of a switch processing a probe packet received from outside of the local network, in accordance with an aspect of the present application.

FIG. 5 presents a flowchart illustrating the process of a switch processing a probe packet received from outside of the local network, in accordance with an aspect of the present application. During operation, the switch can receive a probe packet via an ingress port on a VLAN (operation 502) and determine that the destination MAC address of the probe packet is a multi-destination address (operation 504). The multi-destination address can be a layer-2 multicast or broadcast address. Because the destination address is a multi-destination address, the switch needs to forward the packet via all other ports (i.e., except the ingress port) on which the VLAN has been configured. Therefore, the switch can then identify the rest of the ports configured with the VLAN (operation 506) and forward the probe packet via the identified ports (operation 508). Such an identified port can either send the probe packet to another switch of the local network (e.g., in a client network) or to a switch in another network (e.g., a provider network). If each switch receiving the probe packet repeats this process, the packet can eventually reach all switches of the network. If there is a loop in the local network, the packet can loop back to the other network. Since the probe packet can be generated from the other network, looping the probe packet back to the other network can be indicative of a loop in the local network.

Figure 6:
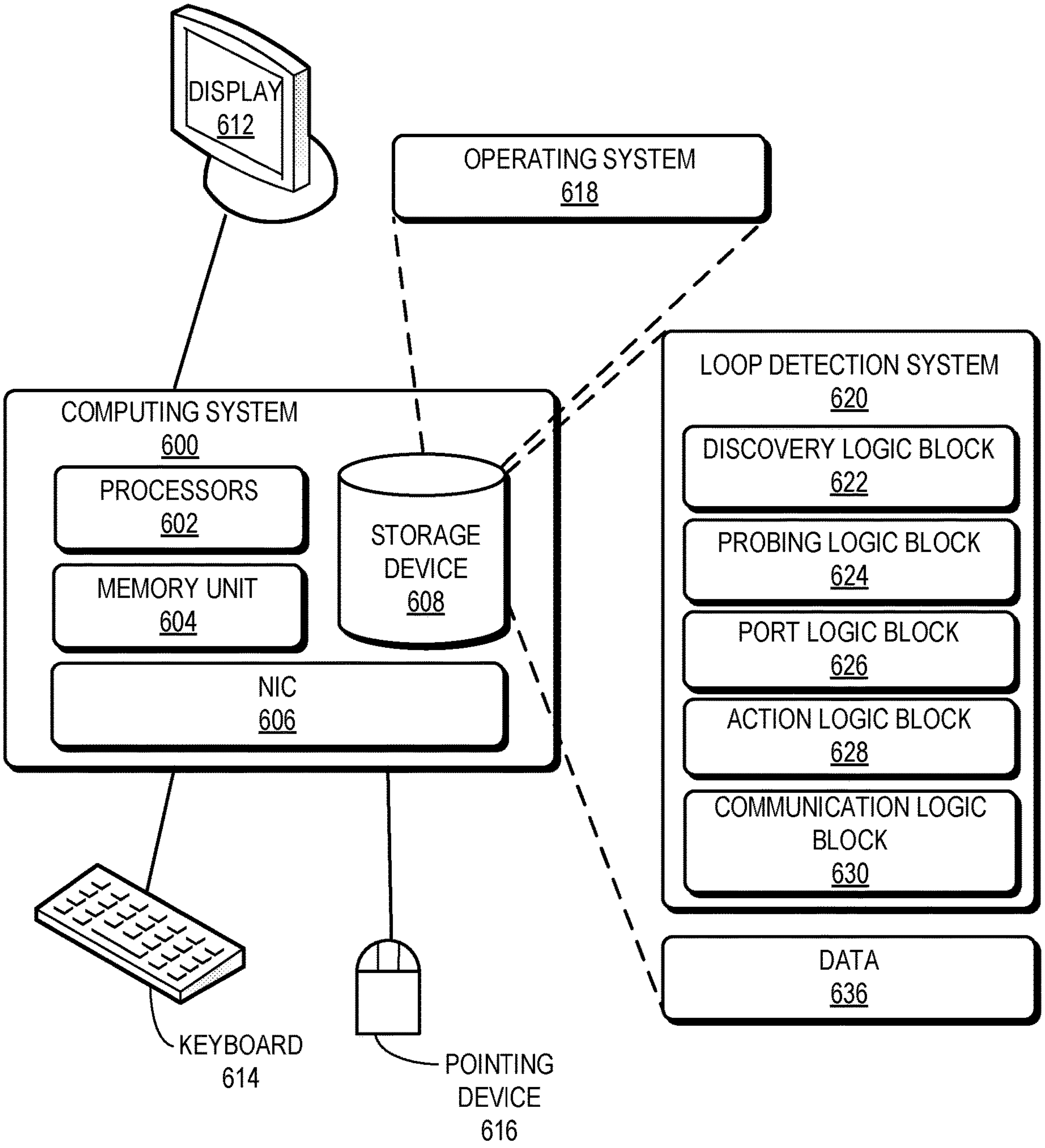
FIG. 6 illustrates an example of a computing system facilitating loop detection in an external network, in accordance with an aspect of the present application.

FIG. 6 illustrates an example of a computing system facilitating loop detection in an external network, in accordance with an aspect of the present application. A computing system 600 can include a set of processors 602, a memory unit 604, a network interface card (NIC) 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618, a loop detection system 620, and data 636.

Loop detection system 620 can include instructions, which when executed by computing system 600, can cause computing system 600 to perform methods and/or processes described in this disclosure. Specifically, loop detection system 620 can include instructions for discovering the external VLANs in an external network (e.g., C-VLANs in a customer network) (discovery logic block 622). Loop detection system 620 can include instructions for probing for detecting a loop on a discovered VLAN (probing logic block 624). The probing can include sending a probe packet via a port from which the VLAN has been discovered.

Loop detection system 620 can also include instructions for determining loop ports (port logic block 626). Moreover, loop detection system 620 can include instructions for identifying a loop in an external network in association with the loop ports (action logic block 628). In addition, loop detection system 620 can include instructions for performing a mitigating action, such as disabling a loop port and disabling the VLAN on the loop port (action logic block 628). Loop management system 620 may include further instructions for sending and receiving packets (communication logic block 630). Data 636 can include any data that can facilitate the operations of loop detection system 620. Data 636 can include, but is not limited to, discovered VLANs and corresponding port identifiers.

Figure 7:
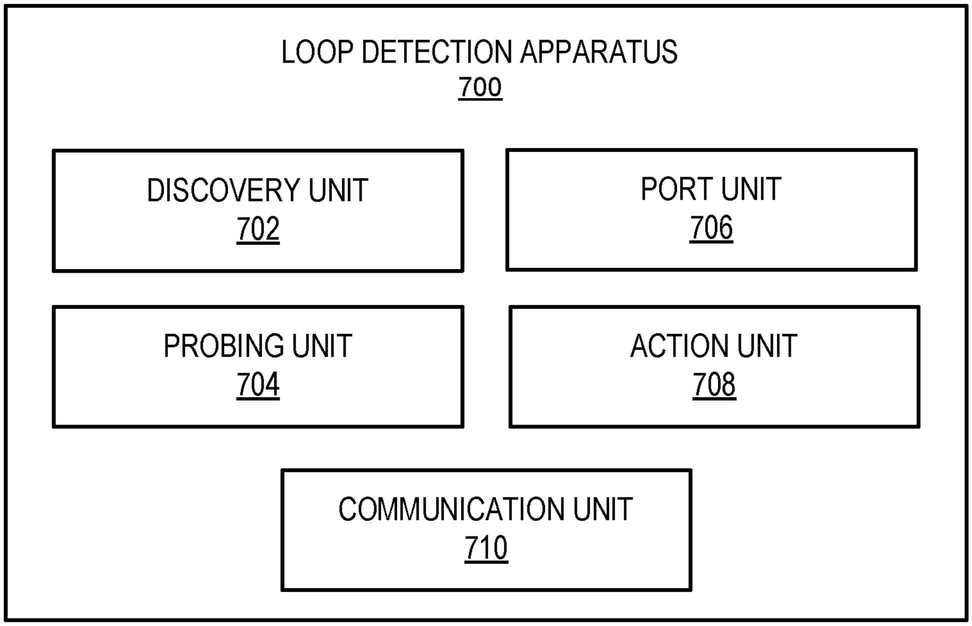
FIG. 7 illustrates an example of an apparatus that facilitates loop detection in an external network, in accordance with an aspect of the present application.

FIG. 7 illustrates an example of an apparatus that facilitates loop detection in an external network, in accordance with an aspect of the present application. Loop detection apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated with a computer system, or realized as a specialized device. For example, apparatus 700 can be an accelerator in a computer system. Specifically, apparatus 700 can comprise units 702-710, which perform functions or operations similar to logic blocks 622-630 of loop management system 620 of FIG. 6. In particular, discovery logic block 622, probing logic block 624; port logic block 626, action logic block 628; and communication logic block 630 can correspond to. a discovery unit 702, a probing unit 704; a port unit 706, an action unit 708; and a communication unit 710, respectively.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a switch in a first network. During operation, the switch can learn a MAC address of a packet received from a second network via a first ingress port of the switch. Here, the MAC address can be learned in association with an aggregate VLAN configured on the first network for traffic from the second network. The switch can then inspect the packet to determine an external VLAN configured on the second network. The switch can send, via the first ingress port, a loop detection packet on the external VLAN. The source address and the detector address of the loop detection packet can both be a local address of the switch. Furthermore, the destination address of the loop detection packet can be a multi-destination address. The switch can identify the local address as the detector address in an ingress packet received from a second ingress port of the switch coupling the second network. Here, the second ingress port can be configured with the external VLAN Accordingly, the switch can identify a loop in the second network in association with the external VLAN and disable transmission via the second ingress port.

In a variation on this aspect, disabling transmission via the second ingress port further comprises one of: turning off the second ingress port and disabling the external VLAN at the second ingress port.

In a variation on this aspect, the switch can select one or more packets for inspection based on one or more of: sampling packets belonging to the aggregate VLAN and mirroring packets belonging to the aggregate VLAN to a processor of the switch.

In a variation on this aspect, the switch can identify the local address as the detector address in an ingress packet received from a third ingress port of the switch coupling a second switch of the first network. Consequently, the switch can identify a loop in the second network on the external VLAN and disable transmission via the first ingress port.

In a variation on this aspect, the local address can include a MAC address allocated to the switch. Furthermore, the multi-destination address can be a multicast address or a broadcast address.

In a variation on this aspect, the switch can send, via the first network, the packet to a remote site of the second network over the aggregate VLAN.

In a variation on this aspect, the first and second ingress ports can be configured with Provider Bridging. The aggregate VLAN can then be a service VLAN (S-VLAN) configured based on the Provider Bridging.

In a variation on this aspect, a respective external VLAN of the second network is mapped to the aggregate VLAN in the first network.

In a variation on this aspect, the switch can determine the ingress packet as a loop detection packet based on one or more header fields of the ingress packet.

In a variation on this aspect, the first network and the second network can be distinct networks under distinct management domains. For example, the first network can be a provider network and the second network can be a customer network.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

learning, by a switch in a first network, a media access control (MAC) address of a packet received from a second network via a first ingress port of the switch, wherein the MAC address is learned in association with an aggregate virtual local area network (VLAN) configured on the first network for traffic from the second network;

inspecting the packet to determine an external VLAN configured on the second network;

sending, via the first ingress port, a loop detection packet on the external VLAN, wherein a source address and a detector address of the loop detection packet are both a local address of the switch, and wherein a destination address of the loop detection packet is a multi-destination address; and in response to identifying the local address as the detector address in an ingress packet received from a second ingress port of the switch coupling a second switch of the first network:

identifying a loop in the second network on the external VLAN; and disabling transmission via the first ingress port.

2. The method of claim 1, further comprising selecting one or more packets for inspection based on one or more of:

sampling packets belonging to the aggregate VLAN; and mirroring packets belonging to the aggregate VLAN to a processor of the switch.

3. The method of claim 1, wherein the local address includes a MAC address allocated to the switch; and wherein the multi-destination address is a multicast address or a broadcast address.

4. The method of claim 1, further comprising sending, by the switch via the first network, the packet to a remote site of the second network over the aggregate VLAN.

5. The method of claim 1, wherein the first and second ingress ports are configured with Provider Bridging, and wherein the aggregate VLAN is a service VLAN (S-VLAN) configured based on the Provider Bridging.

6. The method of claim 1, wherein a respective external VLAN of the second network is mapped to the aggregate VLAN in the first network.

7. The method of claim 1, further comprising determining the ingress packet as a loop detection packet based on one or more header fields of the ingress packet.

8. The method of claim 1, wherein the first network is a provider network and the second network is a customer network.

9. The method of claim 1, wherein, in response to identifying the local address as the detector address in a second ingress packet received from a third ingress port of the switch coupling the second network, the method further comprises:

identifying a second loop in the second network in association with the external VLAN; and disabling transmission via the third ingress port.

10. The method of claim 9, wherein disabling transmission via the third ingress port further comprises one of:

turning off the third ingress port; and disabling the external VLAN at the third ingress port.

11. A non-transitory computer-readable storage medium storing instructions that when executed by a processor of a computer cause the computer to perform a method, the method comprising:

learning, by a switch in a first network, a media access control (MAC) address of a packet received from a second network via a first ingress port of the switch, wherein the MAC address is learned in association with an aggregate virtual local area network (VLAN) configured on the first network for traffic from the second network;

inspecting the packet to determine an external VLAN configured on the second network;

sending, via the first ingress port, a loop detection packet on the external VLAN, wherein a source address and a detector address of the loop detection packet are both a local address of the switch, and wherein a destination address of the loop detection packet is a multi-destination address; and in response to identifying the local address as the detector address in an ingress packet received from a second ingress port of the switch coupling a second switch of the first network:

identifying a loop in the second network on the external VLAN; and disabling transmission via the first ingress port.

12. The non-transitory computer-readable storage medium of claim 11, wherein the method further comprises selecting one or more packets for inspection based on one or more of:

sampling packets belonging to the aggregate VLAN; and mirroring packets belonging to the aggregate VLAN to a processor of the switch.

13. The non-transitory computer-readable storage medium of claim 11, wherein the local address includes a MAC address allocated to the switch; and wherein the multi-destination address is a multicast address or a broadcast address.

14. The non-transitory computer-readable storage medium of claim 11, wherein the method further comprises sending, by the switch via the first network, the packet to a remote site of the second network over the aggregate VLAN.

15. The non-transitory computer-readable storage medium of claim 11, wherein the first and second ingress ports are configured with Provider Bridging, and wherein the aggregate VLAN is a service VLAN (S-VLAN) configured based on the Provider Bridging.

16. The non-transitory computer-readable storage medium of claim 11, wherein a respective external VLAN of the second network is mapped to the aggregate VLAN in the first network.

17. The non-transitory computer-readable storage medium of claim 11, wherein the first network is a provider network and the second network is a customer network.

18. A computer system, comprising:

a processor;

a memory device;

a set of ports, wherein at least one port participates in a first network; and a non-transitory machine-readable medium comprising instructions executable by the processor to:

learn a media access control (MAC) address of a packet received from a second network via a first ingress port in the set of ports, wherein the MAC address is learned in association with an aggregate virtual local area network (VLAN) configured on the first network for traffic from the second network; and inspect the packet to determine an external VLAN configured on the second network;

send, via the first ingress port, a loop detection packet on the external VLAN, wherein a source address and a detector address of the loop detection packet are both a local address of the computer system, and wherein a destination address of the loop detection packet is a multi-destination address;

identify the local address as the detector address in an ingress packet received from a second ingress port in the set of ports coupling a switch of the first network; and in response to identifying the local address as the detector address in the ingress packet received from the second ingress port:

identify a loop in the second network on the external VLAN; and disable transmission via the first ingress port.

19. The non-transitory computer-readable storage medium of claim 11, wherein in response to identifying the local address as the detector address in a second ingress packet received from the third ingress port of the switch coupling the second network, the method further comprises:

identifying a second loop in the second network in association with the external VLAN; and disabling transmission via the third ingress port.

20. The non-transitory computer-readable storage medium of claim 19, wherein disabling transmission via the third ingress port further comprises one of:

turning off the third ingress port; and disabling the external VLAN at the third ingress port.

* * * * *